United States Patent
Kojima et al.

(10) Patent No.: US 8,410,655 B2
(45) Date of Patent: Apr. 2, 2013

(54) STATOR, MOTOR, AND COMPRESSOR

(75) Inventors: Hiroaki Kojima, Kusatsu (JP); Kazuo Ida, Sakai (JP); Yoshihiro Kataoka, Kusatsu (JP); Azusa Ujihara, Uwajima (JP)

(73) Assignee: Daikin Industries, Ltd., Osaka (JP)

( * ) Notice: Subject to any disclaimer, the term of this patent is extended or adjusted under 35 U.S.C. 154(b) by 247 days.

(21) Appl. No.: 13/057,882

(22) PCT Filed: Aug. 7, 2009

(86) PCT No.: PCT/JP2009/064048
§ 371 (c)(1),
(2), (4) Date: Feb. 7, 2011

(87) PCT Pub. No.: WO2010/016583
PCT Pub. Date: Feb. 11, 2010

(65) Prior Publication Data
US 2011/0142696 A1    Jun. 16, 2011

(30) Foreign Application Priority Data

Aug. 7, 2008  (JP) ................... 2008-203848
Aug. 7, 2009  (JP) ................... 2009-184028

(51) Int. Cl.
H02K 1/06  (2006.01)

(52) U.S. Cl. ............. 310/216.048; 310/216.049; 310/45

(58) Field of Classification Search .......... 310/216.001–216.137, 45
See application file for complete search history.

(56) References Cited

U.S. PATENT DOCUMENTS

| | | | |
|---|---|---|---|
| 5,923,112 A * | 7/1999 | Bertocchi et al. ...... 310/216.048 |
| 6,009,607 A * | 1/2000 | Bertocchi et al. ............. 29/33 K |
| 6,265,802 B1 * | 7/2001 | Getschmann .......... 310/216.004 |
| 7,352,101 B2 * | 4/2008 | Fujita ..................... 310/216.011 |
| 7,626,306 B2 * | 12/2009 | Sato ........................ 310/216.055 |
| 8,048,509 B2 * | 11/2011 | Fujita ............................. 428/133 |
| 2006/0181173 A1 | 8/2006 | Takahashi et al. |

FOREIGN PATENT DOCUMENTS

| | | |
|---|---|---|
| JP | 62-221836 A | 9/1987 |
| JP | 4-134179 U | 12/1992 |
| JP | 5-9175 U | 2/1993 |
| JP | 5-29277 U | 4/1993 |
| JP | 7-31086 A | 1/1995 |
| JP | 11-98793 A | 4/1999 |
| JP | 2000-175385 A | 6/2000 |
| JP | 2001-218397 A | 8/2001 |
| JP | 2001-258225 A | 9/2001 |

(Continued)

OTHER PUBLICATIONS

International Search Report of corresponding PCT Application No. PCT/JP2009/064048.

*Primary Examiner* — Thanh Lam
(74) *Attorney, Agent, or Firm* — Global IP Counselors

(57) ABSTRACT

A stator includes a stator core, which has a plurality of stacked electromagnetic steel sheets, caulking portions configured to fix the plurality of electromagnetic steel sheets to each other, and a plurality of slot portions open toward an inner circumference side and arrayed along a circumferential direction. A number Q (an integer of 1 or greater) of the caulking portions, a number S of the slot portions and a number P of the poles satisfy $Q \leqq S$ and $Q = P \times n/2$ (where n is an integer of 1 or greater). The stator is preferably part of a motor for a compressor.

9 Claims, 17 Drawing Sheets

FOREIGN PATENT DOCUMENTS

| | | |
|---|---|---|
| JP | 2003-83251 A | 3/2003 |
| JP | 3586145 B2 | 8/2004 |
| JP | 2005-348557 A | 12/2005 |
| JP | 2006-87222 A | 3/2006 |
| JP | 2006-230087 A | 8/2006 |

\* cited by examiner

STATOR, MOTOR, AND COMPRESSOR

CROSS-REFERENCE TO RELATED APPLICATIONS

This U.S. National stage application claims priority under 35 U.S.C. §119(a) to Japanese Patent Application Nos. 2008-203848, filed in Japan on Aug. 7, 2008, and 2009-184028, filed in Japan on Aug. 7, 2009, the entire contents of which are hereby incorporated herein by reference.

TECHNICAL FIELD

The present invention relates to a stator, a motor and a compressor.

BACKGROUND ART

Conventionally, there has been provided a stator having a stator core including a plurality of stacked electromagnetic steel sheets (see Japanese Patent Publication No. 3586145A). This stator core has a caulking portion for fixing the plurality of electromagnetic steel sheets with one another, and a plurality of slot portions opened toward the inner circumference side and arrayed along the circumferential direction. The number of the caulking portions is larger than that of the slot portions.

SUMMARY

Technical Problem

However, with the conventional stator, since the number of caulking portions is larger than that of the slot portions, there has been an issue that the number of caulking portions that adversely affect the magnetic flux paths is increased, causing the performance to deteriorate. With the number of caulking portions simply decreased, on the other hand, there would be an issue that the inter-pole balance collapses, causing noise and vibrations to increase.

Accordingly, an object of the present invention is to provide a stator capable of improving its performance while preventing noise and vibrations, as well as a motor using the stator, and a compressor using the motor.

Solution to Problem

In order to achieve the above object, there is provided a stator comprising:

a stator core including a plurality of stacked electromagnetic steel sheets, the stator core having caulking portions for fixing the plurality of electromagnetic steel sheets to each other, and a plurality of slot portions opened toward an inner circumference side and arrayed along a circumferential direction, where given a number Q (an integer of 1 or greater) of the caulking portions, a number S of the slot portions (47) and a number P of the poles, it is satisfied that $Q \leq S$ and that $Q = P \times n/2$ (where n is an integer of 1 or greater).

With such a, given a number Q of the caulking portions, a number S of the slot portions and a number P of the poles, it is satisfied that $Q \leq S$ and that $Q = P \times n/2$ (where n is an integer of 1 or greater). Therefore, an inter-magnetic pole balance can be achieved and imbalance of radial magnetic attractions can be prevented, so that noise and vibrations can be prevented.

Further, the number of the caulking portions can be decreased, allowing magnetic flux paths to be ensured, so that the performance can be improved.

In accordance with one aspect of the present invention, it is satisfied that $Q < S$ and that $Q = P \times n/2$ (where n is an integer of 2 or greater), assuming that a number of the caulking portions counting ½ of the number of poles is taken as one set, neighboring caulking portions in each set of the caulking portions are all equal in center angle therebetween, and for all the caulking portions, at least one center angle out of the center angles between neighboring caulking portions in all the caulking portions is different from the other center angles.

With such a stator, since it is satisfied that $Q < S$ and that $Q = P \times n/2$ (where n is an integer of 2 or greater), an inter-magnetic pole balance can be achieved and imbalance of radial magnetic attractions can be prevented, so that noise and vibrations can be prevented. Further, the number of the caulking portions can be decreased, allowing magnetic flux paths to be ensured, so that the performance can be improved.

Assuming that a number of the caulking portions counting ½ of the number of poles is taken as one set, neighboring caulking portions in each set of the caulking portions are all equal in center angle therebetween, so that noise and vibrations can be further reduced.

Also, for all the caulking portions, at least one center angle out of the center angles between neighboring caulking portions in all the caulking portions is different from the other center angles, and therefore all the caulking portions are not of equal intervals. Due to this, there arise degrees of freedom in the position and size of grooves or holes provided in the stator core, making it possible to ensure enough refrigerant or oil passages or cooling-use passages. In contrast to this, if all the caulking portions are of equal intervals with the number of caulking portions smaller than the number of slot portions, then the position and size of grooves or holes that could adversely affect the magnetic flux paths more than the caulking portions are limited.

Thus, the performance can be improved while noise and vibrations are prevented.

In accordance with another aspect of the present invention, for all the caulking portions, a difference between a largest center angle and a smallest center angle out of center angles between individual neighboring caulking portions in all the caulking portions is smaller than 240°/Q.

With such a stator, for all the caulking portions, since the difference between the largest center angle and the smallest center angle out of the center angles between the individual neighboring caulking portions in all the caulking portions is smaller than 240°/Q, the intervals of all the caulking portions can be made closer to equality, so that the fastening strength of the plurality of electromagnetic steel sheets by the caulking portions is improved.

In accordance with another aspect of the present invention, for all the caulking portions, a largest center angle out of the center angles between neighboring caulking portions in all the caulking portions is smaller than two times a smallest center angle.

With such a stator, for all the caulking portions, since the largest center angle out of the center angles between the individual neighboring caulking portions in all the caulking portions is smaller than two times the smallest center angle, the intervals of all the caulking portions can be made closer to equality, so that the fastening strength of the plurality of electromagnetic steel sheets by the caulking portions is improved.

In accordance with another aspect of the present invention, Q is a divisor of S.

With such a stator, since Q is a divisor of S, the caulking portions can be placed at a constant pitch relative to the slot portions, so that the mechanical strength of the stator core is improved.

In accordance with another aspect of the present invention, the stator further comprising:
a coil wound on the stator core, wherein
the stator core has an annular portion, and a plurality of tooth portions projecting radially inward from an inner circumferential surface of the annular portion and arrayed along the circumferential direction, and
the coil is wound not over a plurality of the tooth portions but on each tooth portion, hence concentrated winding.

With such a stator, the coil is provided in concentrated winding, involving more vibrations for structural reasons than in distributed winding. However, for all the tooth portions and the caulking portions, since distances between each one of the tooth portions and the caulking portion nearest to the one tooth portion is set unequal to each other, the characteristic value of vibrations can be dispersed, making it possible to achieve noise reduction.

That is, in concentrated winding, since one coil is wound on one tooth portion, there is a vibrational mode in which the tooth portions vibrate vertically. In this connection, when distances between the tooth portions and the caulking portions are of equality, the characteristic value becomes constant depending on the distance, causing vibrations.

Also, there is provided a motor comprising:
a rotor; and
the above stator, which is placed so as to surround an outer circumferential side of the rotor.

With such a motor, since it includes the stator, the performance can be improved while noise and vibrations are prevented.

Also, there is provided a compressor comprising:
a closed container;
a compression mechanism section placed in the closed container; and
the above motor placed in the closed container, for driving the compression mechanism section.

With such a compressor of this invention, since the compressor includes the motor, the performance can be improved while noise and vibrations are prevented.

In accordance with another aspect of the present invention, a refrigerant in the closed container is carbon dioxide.

With such a compressor, the refrigerant is carbon dioxide, involving higher pressure in the closed container in comparison to R410A or R22 or the like, where high-viscosity oil needs to be used. With high-viscosity oil used, since the oil less easily returns to the compression mechanism section, a large passage for the refrigerant or the oil needs to be provided in the motor.

Then, in the stator core, relatively less variations in magnetic flux density are involved in the radial outside of the tooth portions, where grooves or holes that serve as refrigerant or oil passages are often provided.

Since the passage necessary for the carbon dioxide refrigerant is large in size, it is difficult to provide the caulking portions in vicinities of the tooth portions, and therefore the caulking portions are to be provided radially outside the slot portions. Even when the caulking portions are provided radially outside the slot portions, where larger variations in magnetic flux density are involved, the magnetic flux paths can be ensured because of a decreased number of caulking portions, so that the performance can be improved.

Advantageous Effects of Invention

With the stator in accordance with one or more of the above aspects, given a number Q of the caulking portions, a number S of the slot portions and a number P of the poles, it is satisfied that $Q \leqq S$ and that $Q = P \times n/2$ (where n is an integer of 1 or greater). Therefore, the performance can be improved while noise and vibrations are prevented.

With the stator in accordance with one or more of the above aspects, given a number Q of the caulking portions, a number S of the slot portions and a number P of the poles, it is satisfied that $Q < S$ and that $Q = P \times n/2$ (where n is an integer of 2 or greater), and moreover assuming that a number of the caulking portions counting ½ of the number of poles is taken as one set, neighboring caulking portions in each set of the caulking portions are all equal in center angle therebetween, and for all the caulking portions, at least one center angle out of the center angles between neighboring caulking portions in all the caulking portions is different from the other center angles. Thus, the performance can be improved while noise and vibrations are prevented.

With the motor in accordance with one or more of the above aspects, since the motor includes the stator as described above, the performance can be improved while noise and vibrations are prevented.

With the compressor in accordance with one or more of the above aspects, since the compressor includes the motor as described above, the performance can be improved while noise and vibrations are prevented.

DESCRIPTION OF EMBODIMENTS

Hereinbelow, the present invention will be described in detail by way of embodiments thereof illustrated in the accompanying drawings.

First Embodiment

Figure 1:
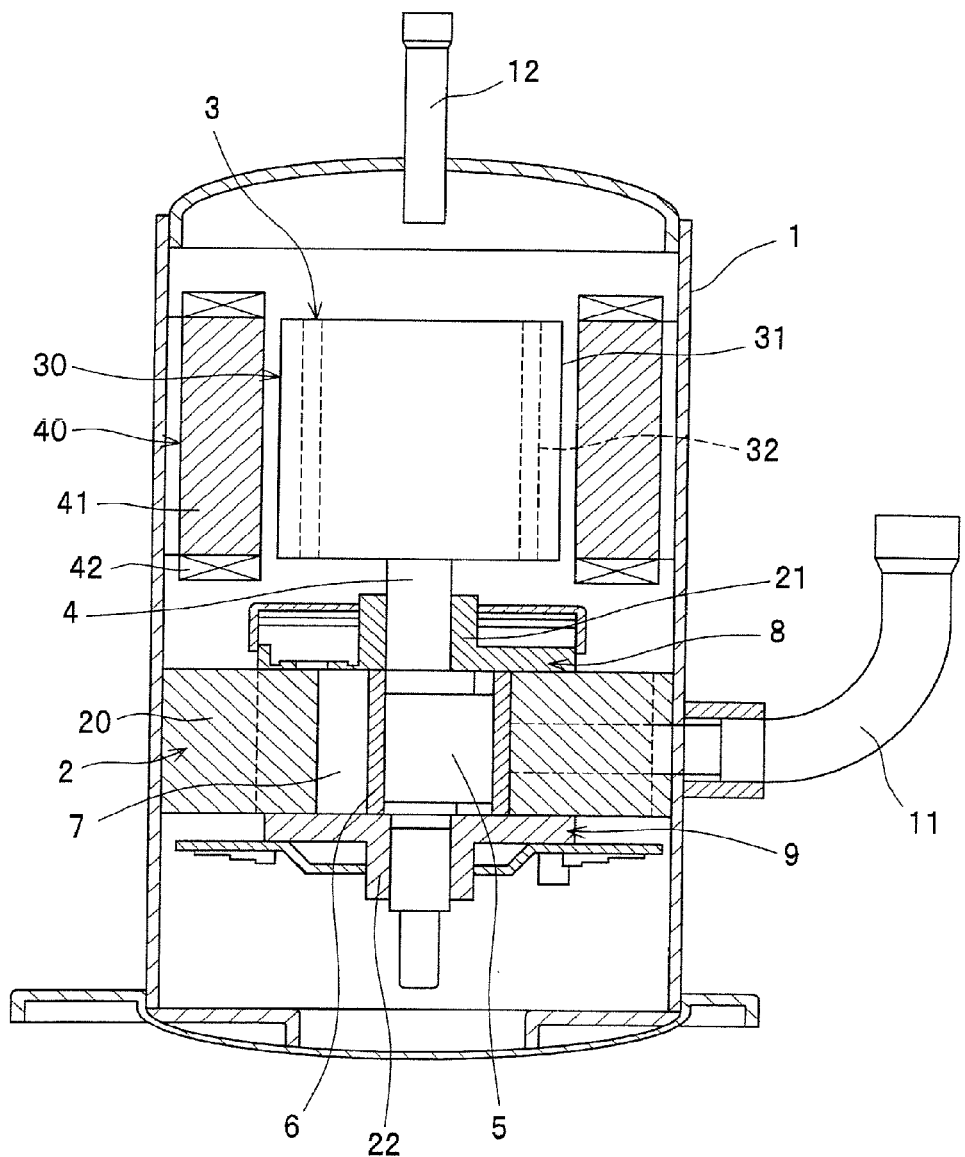
FIG. 1 is a longitudinal sectional view showing an embodiment of a compressor according to the present invention.

FIG. 1 is a longitudinal sectional view showing an embodiment of a compressor according to the present invention. This compressor includes a closed container 1, a compression mechanism section 2 and a motor 3 both placed within the closed container 1. This compressor is a rotary compressor.

To the closed container 1, an intake pipe 11 is connected on the lower lateral side while a discharge pipe 12 is connected on the upper side. A refrigerant supplied through the intake pipe 11 is led to the intake side of the compression mechanism section 2. The refrigerant is carbon dioxide in this case, but may be R410A, R22 or the like.

The motor 3, which is placed on the upper side of the compression mechanism section 2, drives the compression mechanism section 2 via a rotating shaft 4. The motor 3 is placed in a high-pressure region within the closed container 1, which is to be filled with high-pressure refrigerant discharged from the compression mechanism section 2.

The compression mechanism section 2 includes a cylindrical-shaped body portion 20, and an upper end portion 8 and a lower end portion 9 mounted at upper and lower opening ends, respectively, of the body portion 20.

The rotating shaft 4 is inserted inside the body portion 20 so as to extend through the upper end portion 8 and the lower end portion 9. The rotating shaft 4 is rotatably supported by a bearing 21 provided at the upper end portion 8 of the compression mechanism section 2, and a bearing 22 provided at the lower end portion 9 of the compression mechanism section 2.

A crankpin 5 is provided on the rotating shaft 4 in the body portion 20, and compression is fulfilled by a compression chamber 7 formed by a piston 6, which is fitted into and driven by the crankpin 5, and the cylinder corresponding to the piston 6. The piston 6 is rotated in an eccentric state, or makes revolving movement, to vary the capacity of the compression chamber 7.

The motor 3 has a cylindrical-shaped rotor 30 fixed to the rotating shaft 4, and a stator 40 placed so as to surround an outer peripheral side of the rotor 30. The stator 40 is placed radially outside the rotor 30 via an air gap. That is, the motor 3 is an inner rotor type motor.

The rotor 30 has a rotor core 31, and a magnet 32 axially buried and circumferentially arrayed in the rotor core 31.

As shown in FIGS. 1 and 22, the stator 40 has a stator core 41, and a coil 42 wound on the stator core 41.

The stator core 41 has an annular portion 45, and six tooth portions 46 projecting radially inward from the inner circumferential surface of the annular portion 45 and arrayed along the circumferential direction.

Figure 2:
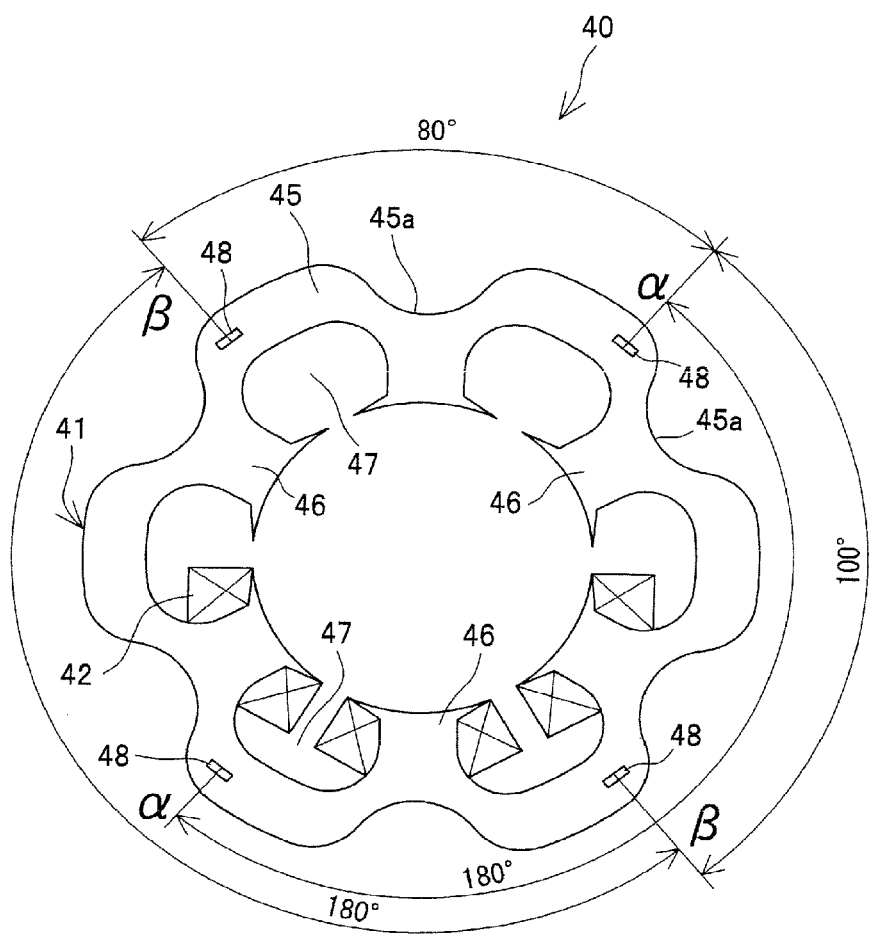
FIG. 2 is a plan view showing a first embodiment of the stator of the invention.

The coil 42 is wound not over a plurality of the tooth portions 46 but on each tooth portion 46, hence concentrated winding. It is noted that FIG. 2 depicts only part of the coil 42.

The stator core 41 has six slot portions 47 opened toward the inner circumference side and arrayed circumferentially. That is, these slot portions 47 are formed between neighboring tooth portions 46.

The stator core 41 includes a plurality of stacked electromagnetic steel sheets. The stator core 41 has caulking portions 48 for fixing the plurality of electromagnetic steel sheets to each other. These caulking portions 48 are provided in the annular portion 45. The caulking portions 48 are positioned radially outside the slot portions 47.

The caulking portions 48 are so designed as to obtain fastening power for two electromagnetic steel sheets by, with making use of a dimensional difference between a hole and a projecting portion due to punch-die clearance of the mold, pushing the projecting portion into the already punched hole of the electromagnetic steel sheet, where the projecting portion is sized larger than the hole. There are clearances between the electromagnetic steel sheets near the caulking portions 48.

The annular portion 45 has groove portions 45a which are formed radially outside the tooth portions 46 so as to be cut out from the outer circumferential surface. These groove portions 45a are provided six in number in correspondence to the tooth portions 46. The groove portions 45a are utilized, for example, for refrigerant or oil passages or for cooling-use passages.

Given that the number of the caulking portions 48 is Q, the number of the slot portions 47 is S and the number of poles is P, then it is satisfied that Q<S and that Q=P×n/2 (where n is an integer of 2 or greater). In this embodiment, S=6, P=4 and n=2, so that Q=4×2/2=4.

Assuming that a number of the caulking portions 48 counting ½ of the number of poles is taken as one set, neighboring caulking portions 48 in each set of the caulking portions 48 are all equal in center angle therebetween. In this embodiment, one set of caulking portions 48 counts P/2=4/2=2, so that all of the caulking portions 48 can be divided into α and β two sets.

In the α set, the center angle between neighboring caulking portions 48 is 180° with equal intervals. In the β set, the center angle between neighboring caulking portions 48 is 180° with equal intervals.

The caulking portions 48 of each set are arrayed alternately in order along the circumferential direction of the stator core 41. That is, caulking portions 48 of the α set and caulking portions 48 of the β set are arrayed in order along the circumferential direction of the stator core 41.

For all the caulking portions 48, at least one of the center angles between neighboring caulking portions 48 in all the caulking portions 48 is different from the other center angles. In other words, not all the caulking portions 48 are of equal intervals between neighboring caulking portions 48. The center angles between neighboring caulking portions 48 are 80° and 100°.

For all the caulking portions 48, a difference between the largest center angle and the smallest center angle out of the center angles between the individual neighboring caulking portions 48 in all the caulking portions 48 is smaller than 240°/Q. That is, the largest center angle is 100°, and the smallest center angle is 80°. The difference between the largest center angle and the smallest center angle is 20°, which is smaller than 240°/Q=240°/4=60°.

Out of the center angles between neighboring caulking portions 48 in all of the caulking portions 48, the largest center angle is smaller than two times the smallest center angle. More specifically, the largest center angle is 100°, and the smallest center angle is 80°. A ratio of the largest center angle to the smallest center angle is 100°/80°=1.25 times, which is smaller than two times.

According to the stator constructed as described above, given a number Q of the caulking portions 48, a number S of the slot portions 47 and a number P of the poles, it is satisfied that Q<S and that Q=P×n/2 (where n is an integer of 2 or greater). Therefore, an inter-magnetic pole balance can be achieved and imbalance of radial magnetic attractions can be prevented, so that noise and vibrations can be prevented. Further, the number of the caulking portions 48 can be decreased, allowing magnetic flux paths to be ensured, so that the performance can be improved.

Figure 3A:
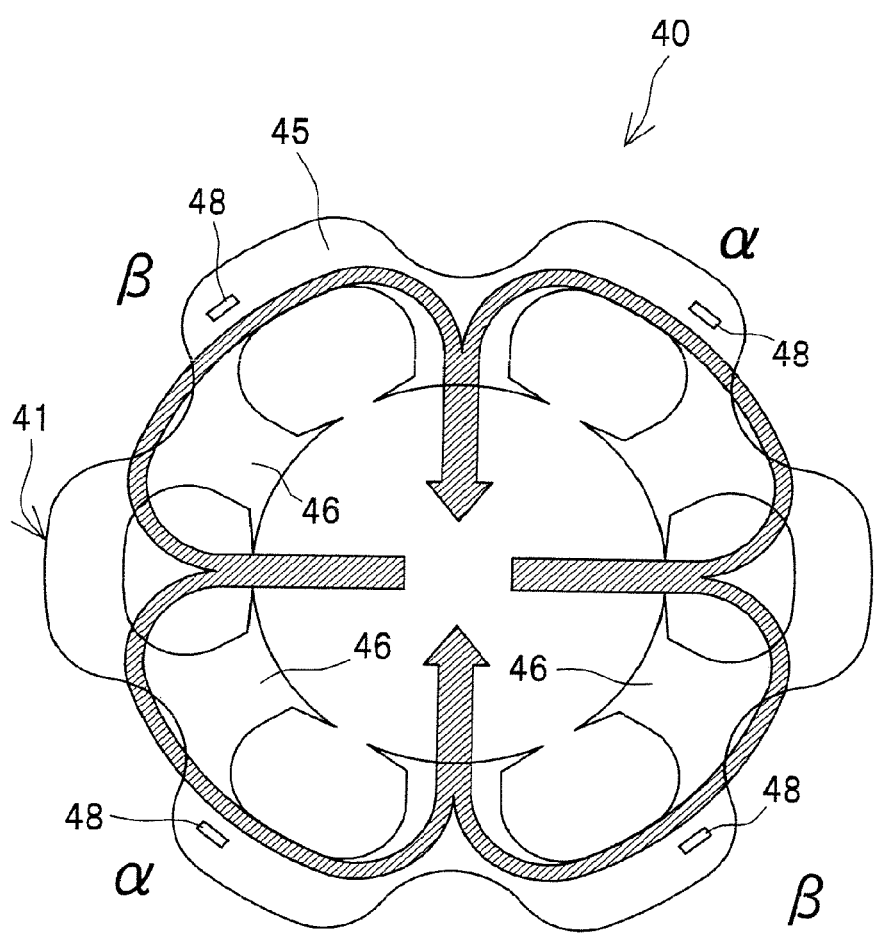
FIG. 3A is an explanatory view showing flows of magnetic flux.
Figure 3B:
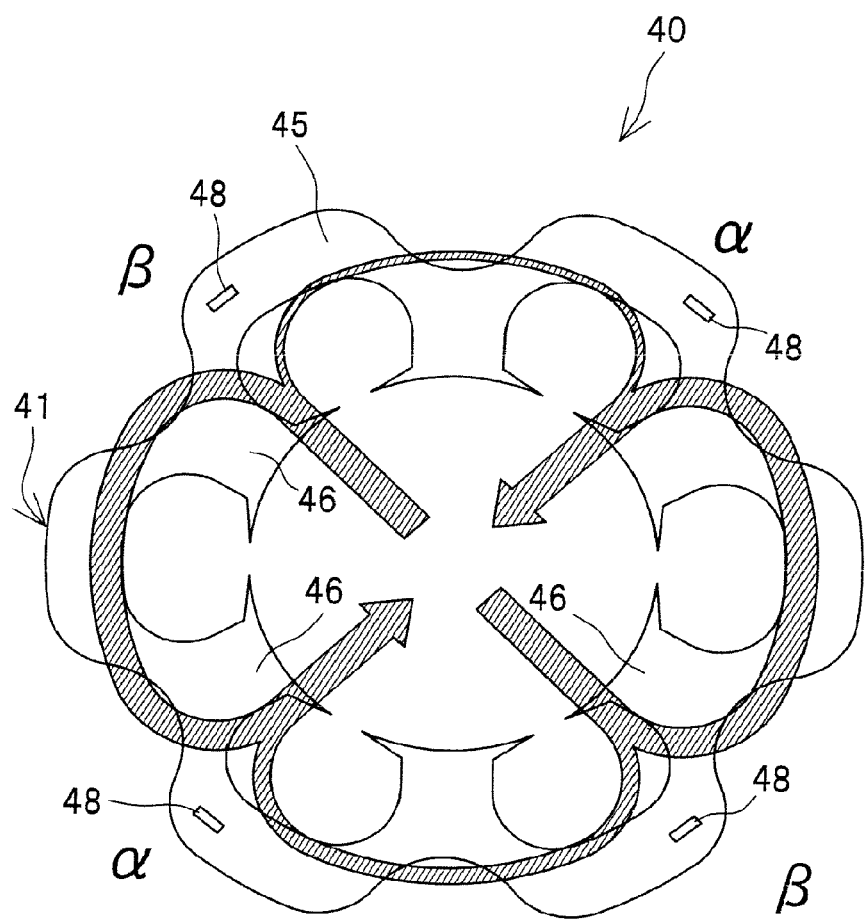
FIG. 3B is an explanatory view showing flows of magnetic flux.

In more detail, in FIGS. 3A and 3B, in which arrows of solid line show flows of magnetic flux, the magnetic flux paths in portions including caulking portions 48 are narrower in width and the magnetic flux paths in portions including no caulking portions 48 are wider in width, while combined magnetic fields that reach the rotor are equal in magnitude for all the four magnetic poles. Thus, an inter-magnetic pole balance is achieved. FIG. 3B shows a state that the rotating magnetic field of FIG. 3A has progressed by 45° clockwise. In FIGS. 3A and 3B, the coil 42 is omitted in depiction.

Also, assuming that a number of caulking portions 48 counting ½ of the pole number is taken as one set, for each set of caulking portions 48, the center angles between neighboring caulking portions 48 are all equal for the caulking portions 48 of each set, so that noise and vibrations can be further prevented.

Also, for all the caulking portions 48, since at least one center angle out of the center angles between neighboring caulking portions 48 in all the caulking portions 48 is different from the other center angles, not all the caulking portions 48 are of equal intervals. Due to this, there arise degrees of freedom in the position and size of grooves (e.g., groove portions 45a) or holes provided in the stator core 41, making it possible to ensure enough refrigerant or oil passages or cooling-use passages. In other words, the caulking portions 48 can be provided without constraints caused by grooves or holes provided in the stator core 41.

Figure 4:
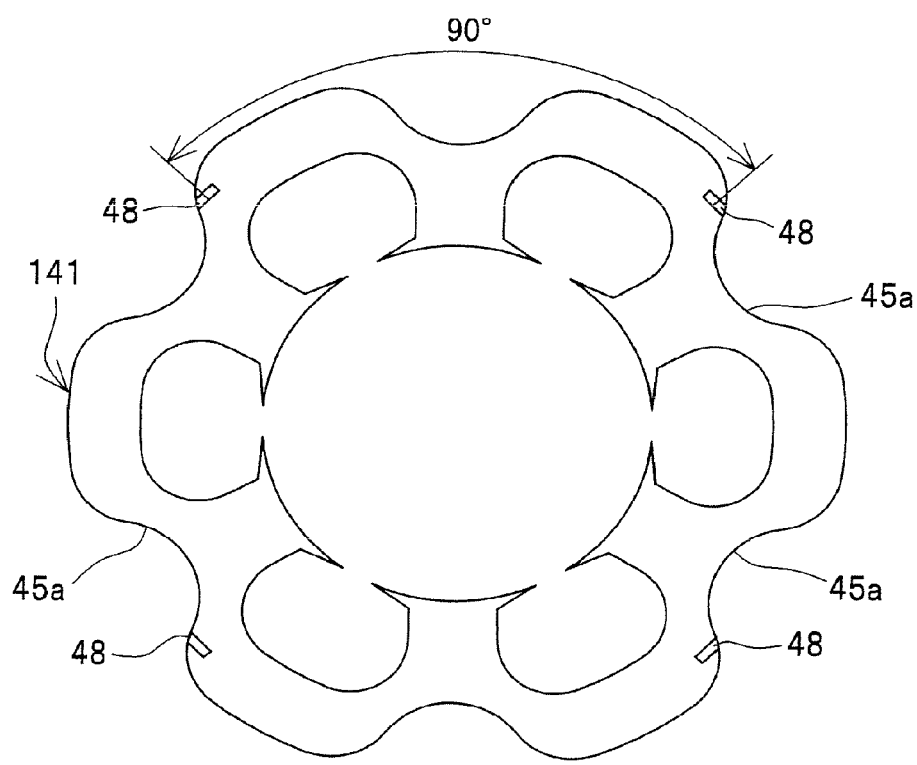
FIG. 4 is a plan view showing a comparative example of the stator core.

In contrast to this, if all the caulking portions are of equal intervals with the number of caulking portions 48 smaller than the number of slot portions 47, then the position and size of grooves or holes that could adversely affect the magnetic flux paths more than the caulking portions 48 are limited. Further, when all the caulking portions 48 are set equal in intervals as shown in FIG. 4, presence of large groove portions 45a in the outer peripheral portion of the stator core 141 would cause a problem that the caulking portions 48 overflow from the groove portions 45a.

Also, for all the caulking portions 48, since the difference between the largest center angle and the smallest center angle out of the center angles between the individual neighboring caulking portions 48 in all the caulking portions 48 is smaller than 240°/Q, the intervals of all the caulking portions 48 can be made closer to equality, so that the fastening strength of the plurality of electromagnetic steel sheets by the caulking portions 48 is improved. In contrast to this, if the difference between the largest center angle and the smallest center angle is larger than 240°/Q, then the intervals of all the caulking portions 48 cannot be made closer to equality, so that the fastening strength by the caulking portions 48 deteriorates.

Further, for all the caulking portions 48, since the largest center angle out of the center angles between the individual neighboring caulking portions 48 in all the caulking portions 48 is smaller than two times the smallest center angle, the intervals of all the caulking portions 48 can be made closer to equality, so that the fastening strength of the plurality of electromagnetic steel sheets by the caulking portions 48 is improved. In contrast to this, if the largest center angle is larger than two times the smallest center angle, then the intervals of all the caulking portions 48 cannot be made closer to equality, so that the fastening strength by the caulking portions 48 deteriorates.

Also, the coil 42 is provided in concentrated winding, involving more vibrations for structural reasons than in distributed winding. However, for all the tooth portions 46 and the caulking portions 48, since distances between each one of the tooth portions 46 and the caulking portion 48 nearest to the one tooth portion 46 is set unequal to each other, the characteristic value of vibrations can be dispersed, making it possible to achieve noise reduction.

That is, in concentrated winding, since one coil 42 is wound on one tooth portion 46, there is a vibrational mode in which the tooth portions 46 vibrate vertically. In this connection, when distances between the tooth portions 46 and the caulking portions 48 are of equality, the characteristic value becomes constant depending on the distance, causing vibrations.

Further, according to the motor constructed as described above, since the motor includes the above-described stator 40, performance improvement can be achieved while noise and vibrations can be prevented.

Further, according to the compressor constructed as described above, since the compressor includes the above-described motor 3, performance improvement can be achieved while noise and vibrations can be prevented.

Further, the refrigerant is carbon dioxide, involving higher pressure in the closed container 1 in comparison to R410A or R22 or the like, where high-viscosity oil needs to be used. With high-viscosity oil used, since the oil less easily returns to the compression mechanism section 2, a large passage for the refrigerant or the oil needs to be provided in the motor 3.

Then, in the stator core 41, relatively less variations in magnetic flux density are involved in the radial outside of the tooth portions 46, where grooves or holes that serve as refrigerant or oil passages are often provided.

Since the passage necessary for the carbon dioxide refrigerant is large in size, it is difficult to provide the caulking portions 48 in vicinities of the tooth portions 46, and therefore the caulking portions 48 are to be provided radially outside the slot portions 47. Even when the caulking portions 48 are provided radially outside the slot portions 47, where larger variations in magnetic flux density are involved, the magnetic flux paths can be ensured because of a decreased number of caulking portions 48, so that the performance can be improved.

Second Embodiment

Figure 5:
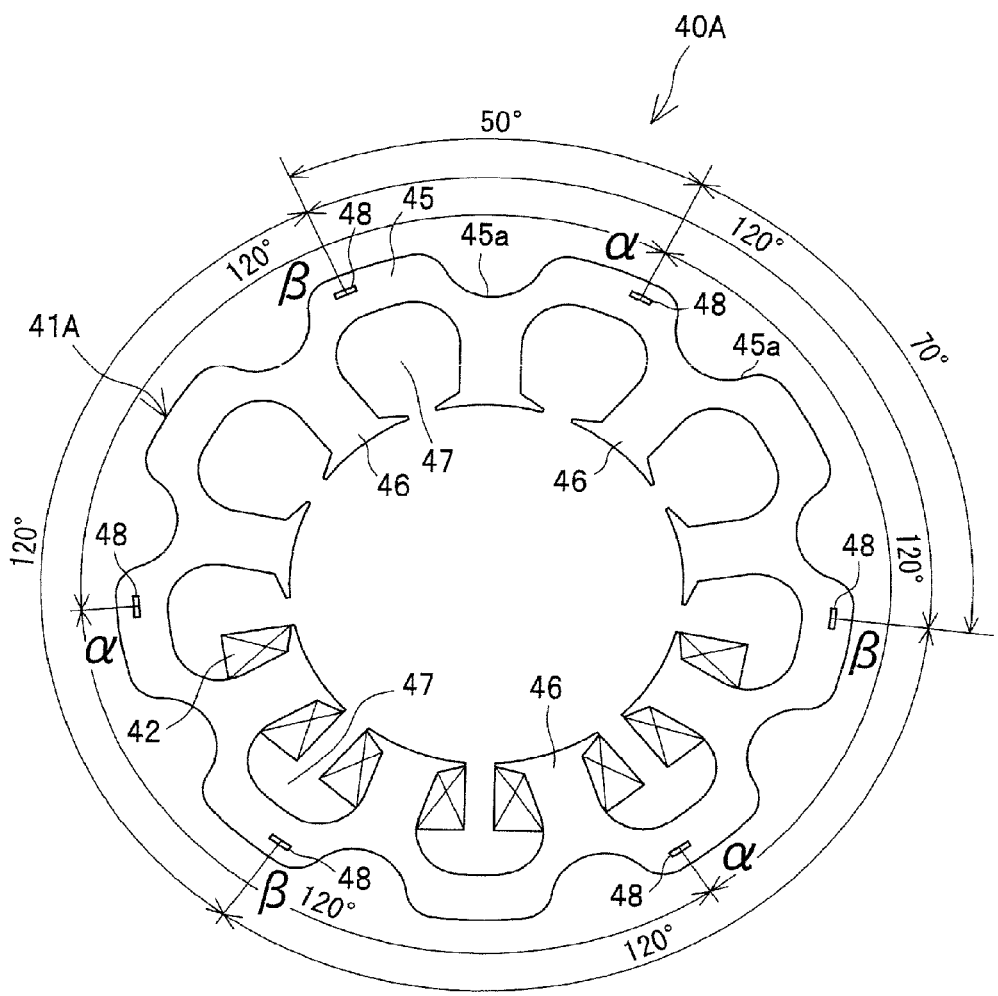
FIG. 5 is a plan view showing a second embodiment of the stator of the invention.

FIG. 5 shows a second embodiment of the stator according to the invention. As to differences from the first embodiment, this second embodiment differs therefrom in the shape of the stator. The rest of the structure is similar to that of the first embodiment and therefore omitted in description.

In a stator 40A of this second embodiment, a number S of slot portions 47 of a stator core 41A is 9, a number P of poles is 6, a factor n is 2, and a number Q of caulking portions 48 of the stator core 41A is Q=P×n/2=6×2/2=6.

The number of caulking portions 48 of one set counts P/2=6/2=3, and all the caulking portions 48 can be divided into two sets, α and β sets.

The α set of caulking portions 48 and the β set of caulking portions 48 are arrayed in order along the circumferential direction of the stator core 41A.

In the α set, the center angle between neighboring caulking portions 48 is 120°, being of equal intervals. In the β set, the center angle between neighboring caulking portions 48 is 120°, being of equal intervals.

For all the caulking portions 48, center angles between neighboring caulking portions 48 are 50° and 70°.

A difference between the largest center angle, 70°, and the smallest center angle, 50°, is 20°, which is smaller than 240°/Q=240°/6=40°.

A ratio of the largest center angle, 70°, to the smallest center angle, 50°, is 70°/50°=1.4 times, which is smaller than two times.

Figure 6:
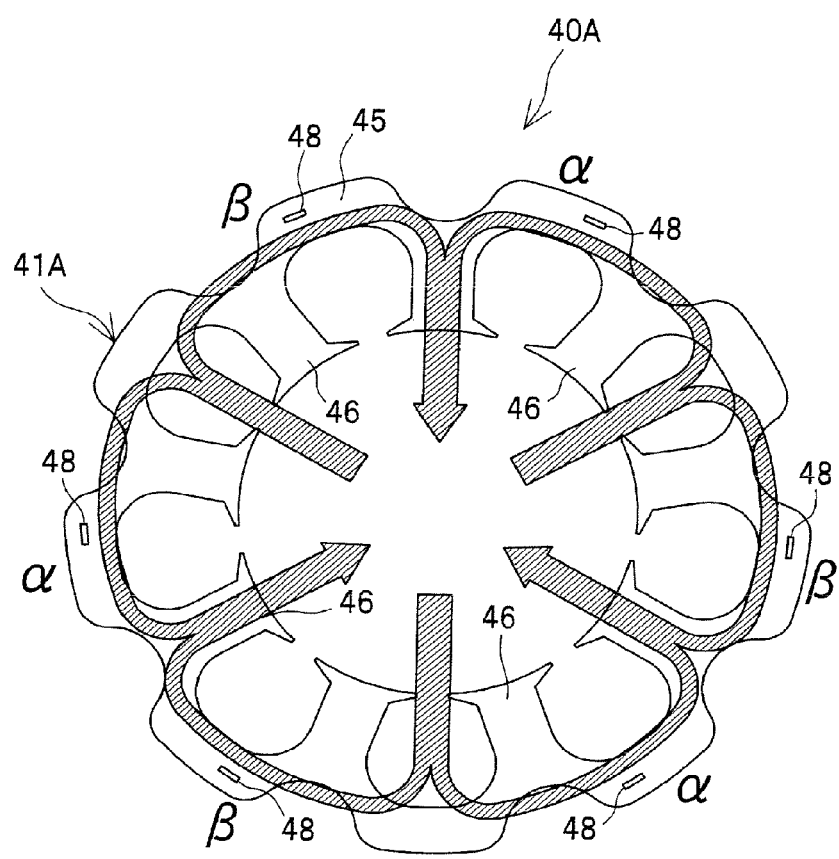
FIG. 6 is an explanatory view showing flows of magnetic flux.

The stator constructed as described above has the same effects as in the first embodiment. In more detail, in FIG. 6, in which arrows of solid line show flows of magnetic flux, the magnetic flux paths in portions including caulking portions 48 are narrower in width and the magnetic flux paths in portions including no caulking portions 48 are wider in width, while combined magnetic fields that reach the rotor are equal in magnitude for all the six magnetic poles. Thus, an intermagnetic pole balance is achieved. In FIG. 6, the coil 42 is omitted in depiction.

Figure 7:
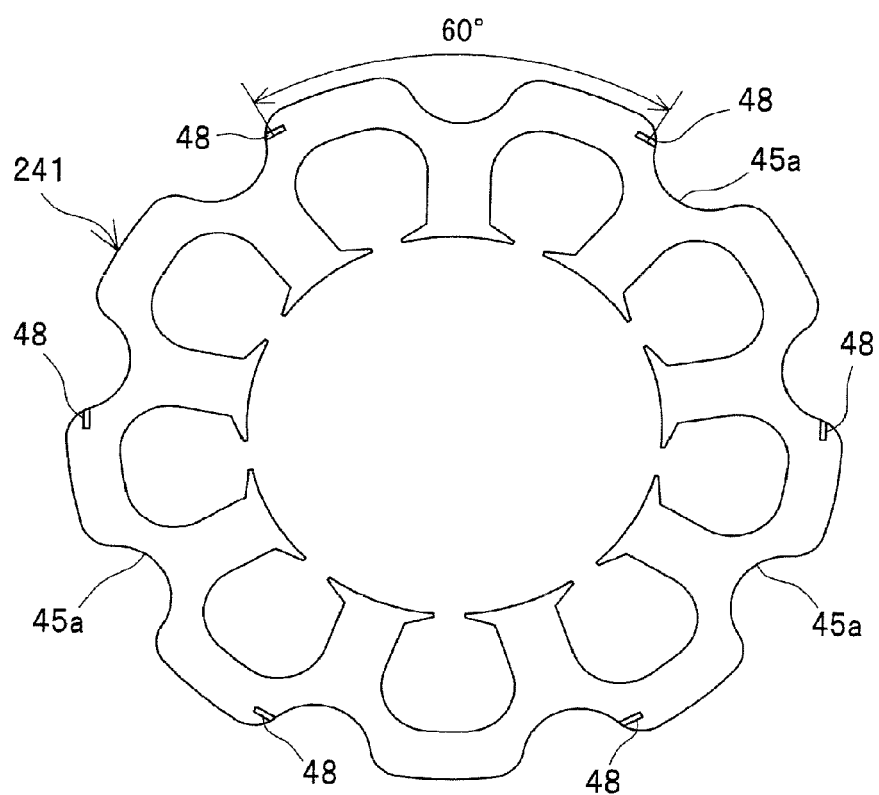
FIG. 7 is a plan view showing a comparative example of the stator core.

Also, since all the caulking portions 48 are not of equal intervals, the caulking portions 48 can be provided without constraints caused by the groove portions 45a provided in the stator core 41A. In contrast to this, if all the caulking portions 48 are of equal intervals as shown in FIG. 7, presence of large groove portions 45a in the outer peripheral portion of a stator core 241 would cause a problem that the caulking portions 48 overflow from the groove portions 45a.

Third Embodiment

Figure 8:
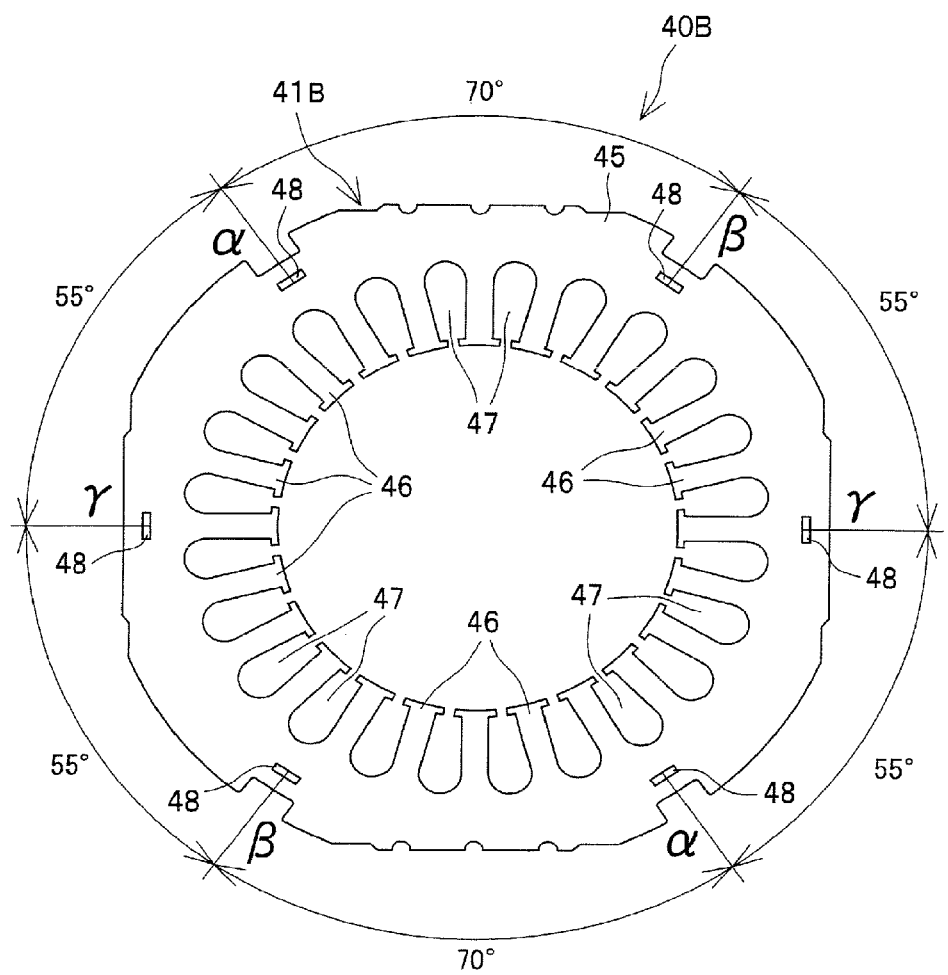
FIG. 8 is a plan view showing a third embodiment of the stator of the invention.

FIG. 8 shows a third embodiment of the stator according to the invention. As to differences from the first embodiment, this third embodiment differs therefrom in the shape of the stator. The rest of the structure is similar to that of the first embodiment and therefore omitted in description.

In a stator 40B of this third embodiment, the coil is provided in distributed winding, i.e., wound over a plurality of tooth portions 46. In FIG. 8, the coil is omitted in depiction.

A number S of slot portions 47 of a stator core 41B is 24, a number P of poles is 4, a factor n is 3, and a number Q of caulking portions 48 of the stator core 41B is Q=P×n/2=4×3/2=6.

The number of caulking portions 48 of one set counts P/2=4/2=2, and all the caulking portions 48 can be divided into three sets, α, β and γ sets.

The α set of caulking portions 48, the β set of caulking portions 48 and the γ set of caulking portions 48 are arrayed in order along the circumferential direction of the stator core 41B.

In the α set, the center angle between neighboring caulking portions 48 is 180°, being of equal intervals. In the β set, the center angle between neighboring caulking portions 48 is 180°, being of equal intervals. In the γ set, the center angle between neighboring caulking portions 48 is 180°, being of equal intervals.

For all the caulking portions 48, center angles between neighboring caulking portions 48 are 55° and 70°.

A difference between the largest center angle, 70°, and the smallest center angle, 55°, is 15°, which is smaller than 240°/Q=240°/6=40°.

A ratio of the largest center angle, 70°, to the smallest center angle, 55°, is 70°/55°=1.27 times, which is smaller than two times.

The stator constructed as described above has the same effects as in the first embodiment, so that the performance can be improved while noise and vibrations are prevented.

Fourth Embodiment

Figure 9:
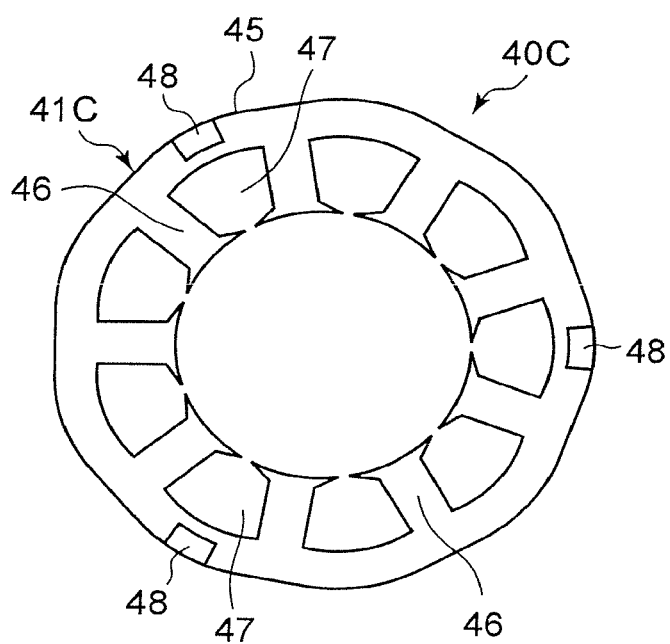
FIG. 9 is a plan view showing a fourth embodiment of the stator of the invention.

FIG. 9 shows a fourth embodiment of the stator according to the invention. As to differences from the first embodiment, this fourth embodiment differs therefrom in the shape of the stator. The rest of the structure is similar to that of the first embodiment and therefore omitted in description.

In a stator 40C of this fourth embodiment, it is satisfied that Q≦S and that Q=P×n/2 (where n is an integer of 1 or greater). A number S of slot portions 47 of a stator core 41C is 9, a number P of poles is 6, a factor n is 1, and a number Q of caulking portions 48 of the stator core 41C is Q=P×n/2=6×1/2=3.

Q (=3) is a divisor of S (=9), and the center angle between neighboring caulking portions 48 is 120° for all the caulking portions 48. That is, the caulking portions 48 can be placed at a constant pitch relative to the slot portions 47, so that the mechanical strength of the stator core 41C is improved.

Figure 10A:
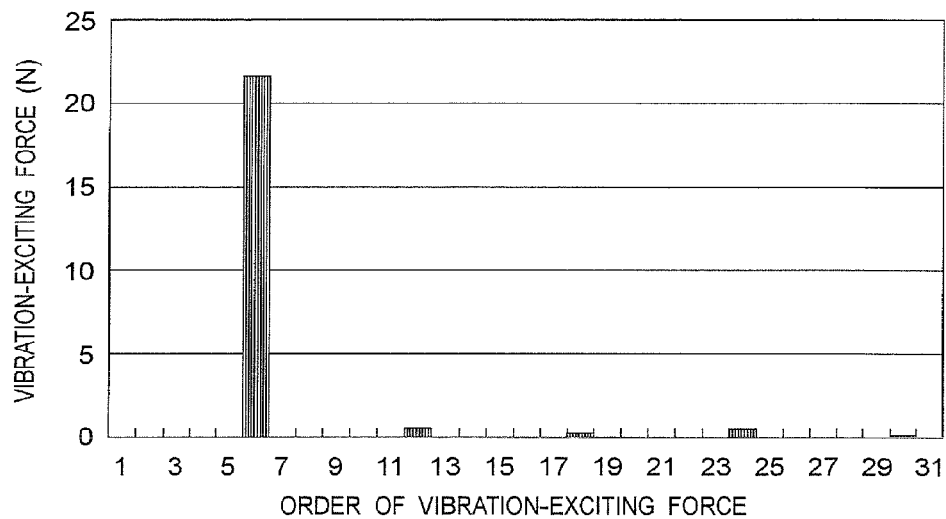
FIG. 10A is a graph showing vibration-exciting forces that act on individual tooth portions.

Vibration-exciting force that acts on the stator 40C of the above construction is explained. FIG. 10A shows vibration-exciting force acting on each tooth portion 46. In FIG. 10A, the horizontal axis represents the order of vibration-exciting force and the vertical axis represents vibration-exciting force (N), thus showing a graph in which waveforms of vibration-exciting force acting on the individual tooth portions 46 are FFT (Finite Fourier Transform)-transformed. Thus, nine tooth portions 46 are shown by nine bar charts.

In this connection, the term 'order' refers to an vibration-exciting force mode generated in one rotation of the rotor. For example, an order of 6N means that the stator vibrates six times by one rotation of the rotor.

As can be understood from FIG. 10A, vibration-exciting force is generated at each tooth portion 46 with the order being 6N, 12N, 18N, 24N and 30N, where the vibration-exciting forces acting on the individual tooth portions 46 are balanced. When the order is 6N, the largest vibration-exciting force acts.

Figure 10B:
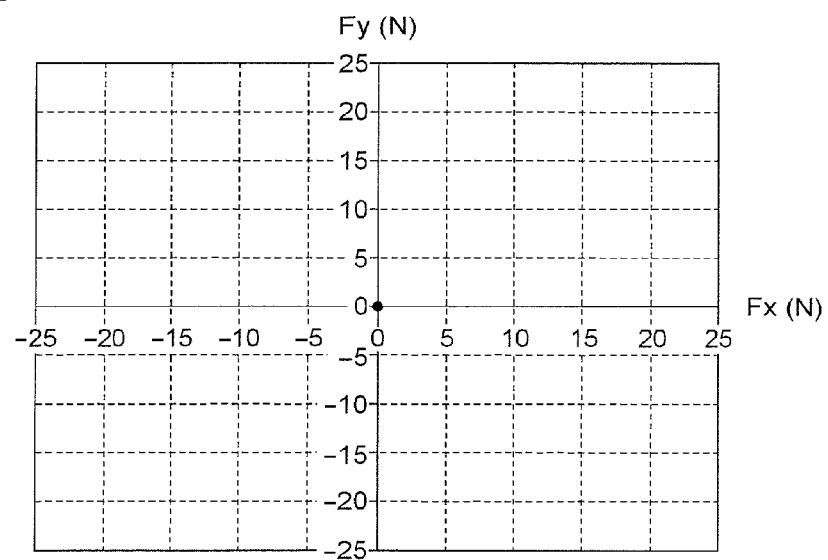
FIG. 10B is a graph showing vibration-exciting forces that act on the whole stator.

Then, FIG. 10B shows a vibration-exciting force acting on the whole stator 40C. Shown in FIG. 10B is a graph in which vibration-exciting forces having an order of 6N acting on the individual tooth portions 46 are totaled for x and y components, respectively, in a plane orthogonal to the axis of the stator 40C.

As can be understood from FIG. 10B, the vibration-exciting force for the whole stator 40C results in 0, meaning that no force attributed to vibration-exciting forces acts on the stator 40C.

Figure 11:
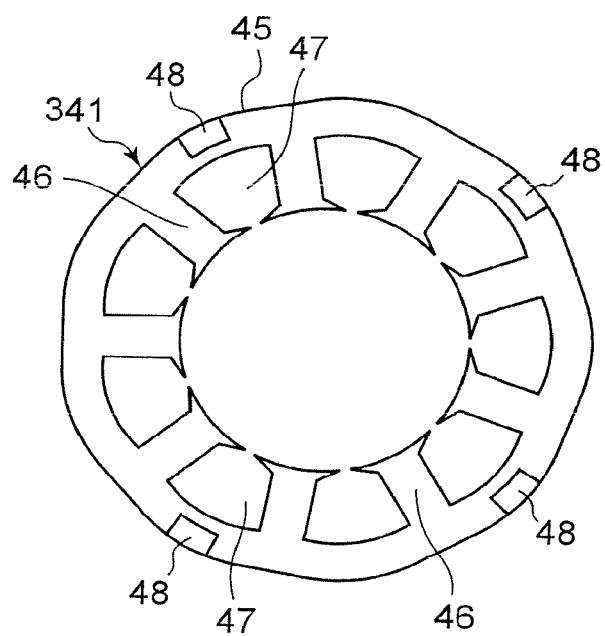
FIG. 11 is a plan view showing a comparative example of the stator core.

In contrast to this, with a stator core 341 as a comparative example shown in FIG. 11, a number S of slot portions 47 is 9, a number P of poles is 6, and a number Q of caulking portions 48 is 4, in which case it is not satisfied that Q=P×n/2 (where n is an integer of 1 or greater).

Figure 12A:
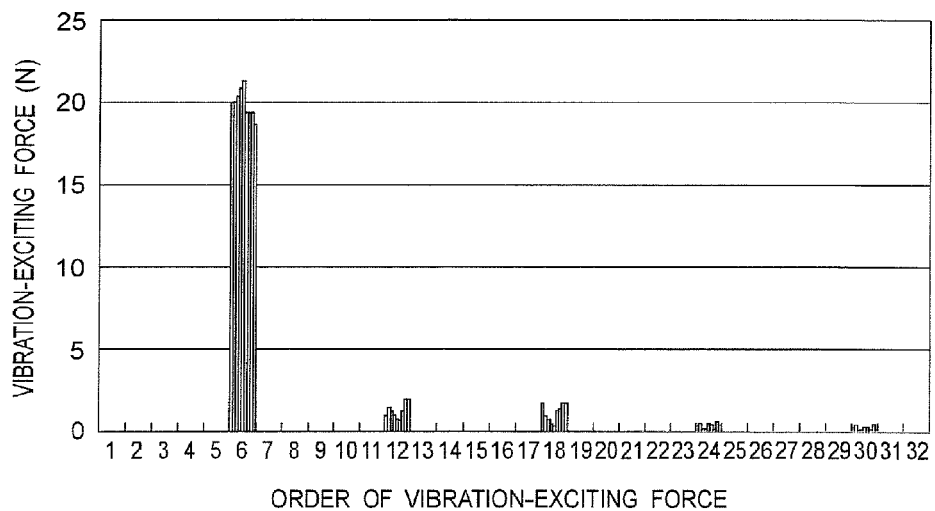
FIG. 12A is a graph showing vibration-exciting forces that act on individual tooth portions.

In this stator core 341, vibration-exciting force is generated at each tooth portion 46 with the order being 6N, 12N, 18N, 24N and 30N as shown in FIG. 12A, while vibration-exciting forces acting on the individual tooth portions 46 are unbalanced.

Figure 12B:
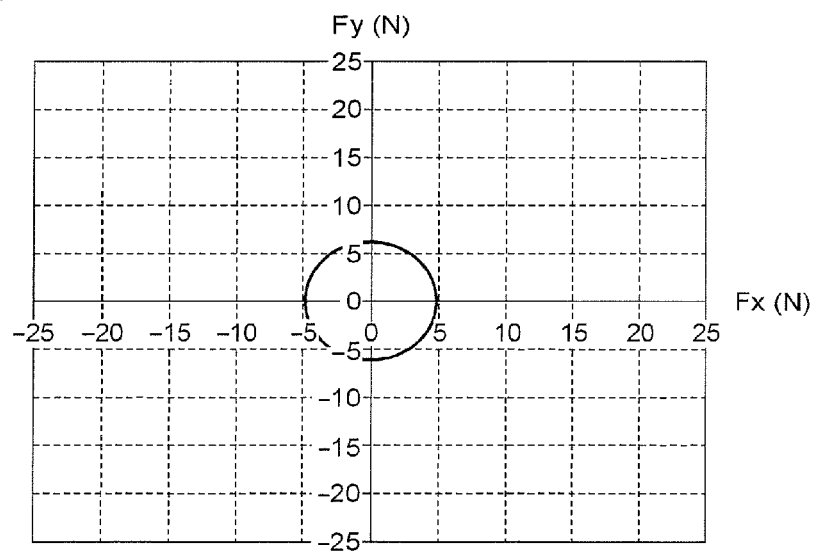
FIG. 12B is a graph showing vibration-exciting forces that act on the whole stator.

Then, as shown in FIG. 12B, a vibration-exciting force acting on the whole stator with the order of 6N results in a circular shape whose center is given by the origin, so that a force to rotate the stator about the axis of the stator acts on the stator.

According to the stator constructed as described above, since it is satisfied that Q≦S and that Q=P×n/2 (where n is an integer of 1 or greater), an inter-magnetic pole balance can be achieved and imbalance of radial magnetic attractions can be prevented, so that noise and vibrations can be prevented.

Also, decreasing the number of the caulking portions 48 leads to a reduction of electromagnetic vibrations in the axial direction of the stator. That is, since the axial rigidity differs between the caulking portions 48 and the remaining portions other than the caulking portions 48, stack thickness of the stator core with the coil wound thereon changes due to the presence or absence of the caulking portions 48, causing occurrence of misalignment of the end surface. The misalignment of the end surface causes increases in the axial electromagnetic vibration-exciting forces, and smaller numbers of caulking portions lead to smaller misalignment of the end surface, allowing the axial electromagnetic vibrations to be reduced.

Further, since decreasing the number of the caulking portions 48 leads to a lessened clearance between one steel sheet and another, the contact closeness is improved, so that axial movement of one electromagnetic steel sheet is restrained, resulting in lowered electromagnetic vibrations.

Also, since decreasing the number of the caulking portions 48 leads to lessened characteristic deteriorations of the electromagnetic steel sheets due to punching strain of the caulking portions 48, degradation of the motor efficiency is lessened.

Also, since decreasing the number of the caulking portions 48 leads to lessened insulation deteriorations of the electromagnetic steel sheets in the axial direction of the caulking portions 48, eddy currents are lessened and degradation of the motor efficiency is lessened.

Also, since decreasing the number of the caulking portions 48 makes magnetic flux to flow through the caulking portions 48, a smaller number of degradation of the magnetic flux leads to a smaller lessening of the magnetic flux and the degradation of the motor efficiency is lessened.

Fifth Embodiment

Figure 13:
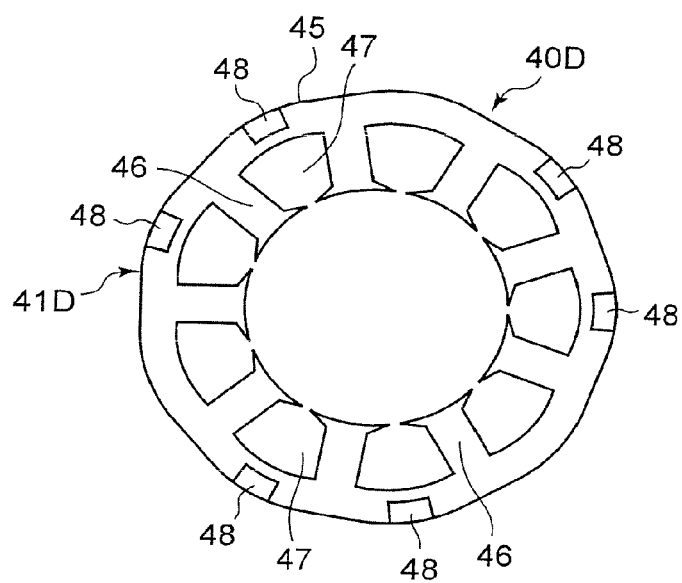
FIG. 13 is a plan view showing a fifth embodiment of the stator of the invention.

FIG. 13 shows a fifth embodiment of the stator according to the invention. As to differences from the fourth embodiment, this fifth embodiment differs therefrom in the shape of the stator. The rest of the structure is similar to that of the fourth embodiment and therefore omitted in description.

In a stator 40D of this fifth embodiment, it is satisfied that Q≦S and that Q=P×n/2 (where n is an integer of 1 or greater). A number S of slot portions 47 of a stator core 41D is 9, a number P of poles is 6, a factor n is 2, and a number Q of caulking portions 48 of the stator core 41D is Q=P×n/2=6× 2/2=6. Q (=6) is a divisor of S (=9).

Figure 14A:
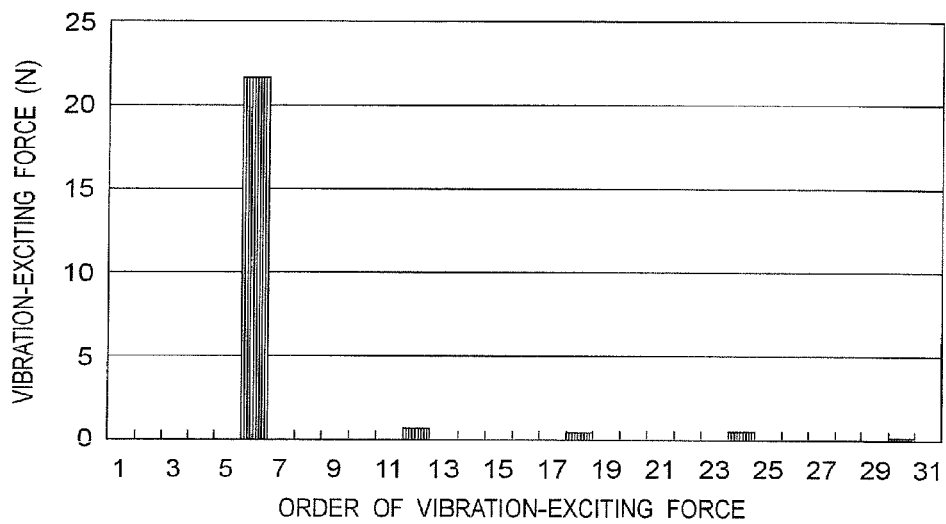
FIG. 14A is a graph showing vibration-exciting forces that act on individual tooth portions.

Vibration-exciting force that acts on the stator 40D of the above construction is explained. As shown in FIG. 14A, vibration-exciting force is generated at each tooth portion 46 with the order being 6N, 12N, 18N, 24N and 30N, where the vibration-exciting forces acting on the individual tooth portions 46 are balanced.

Figure 14B:
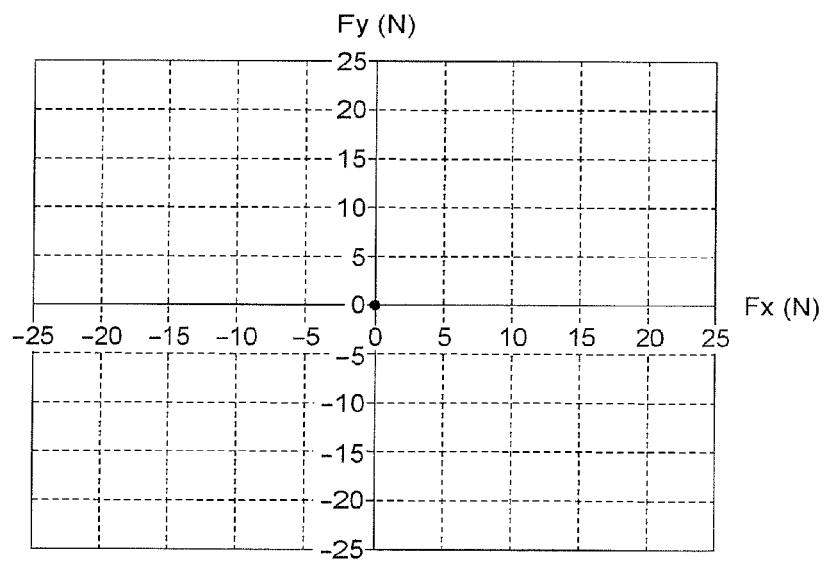
FIG. 14B is a graph showing vibration-exciting forces that act on the whole stator.

Then, as shown in FIG. 14B, the vibration-exciting force acting on the whole stator 40D results in 0, meaning that no force attributed to vibration-exciting forces acts on the stator 40D.

According to the stator constructed as described above, since it is satisfied that Q≦S and that Q=P×n/2 (where n is an integer of 1 or greater), an inter-magnetic pole balance can be achieved and imbalance of radial magnetic attractions can be prevented as with the functional effects of the fourth embodiment, so that noise and vibrations can be prevented.

Sixth Embodiment

Figure 15:
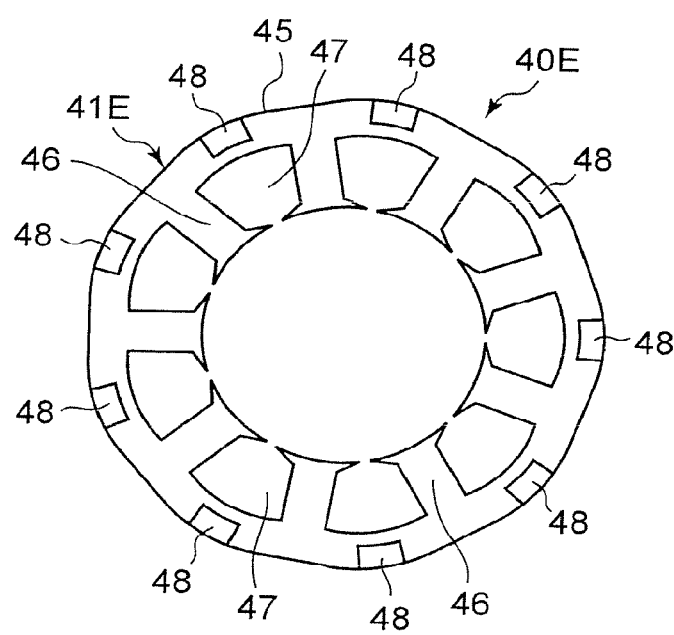
FIG. 15 is a plan view showing a sixth embodiment of the stator of the invention.

FIG. 15 shows a sixth embodiment of the stator according to the invention. As to differences from the fourth embodiment, this sixth embodiment differs therefrom in the shape of the stator. The rest of the structure is similar to that of the fourth embodiment and therefore omitted in description.

In a stator 40E of this sixth embodiment, it is satisfied that Q≦S and that Q=P×n/2 (where n is an integer of 1 or greater). A number S of slot portions 47 of a stator core 41E is 9, a number P of poles is 6, a factor n is 3, and a number Q of caulking portions 48 of the stator core 41E is Q=P×n/2=6×3/ 2=9. Q (=9) is a divisor of S (=9).

Figure 16A:
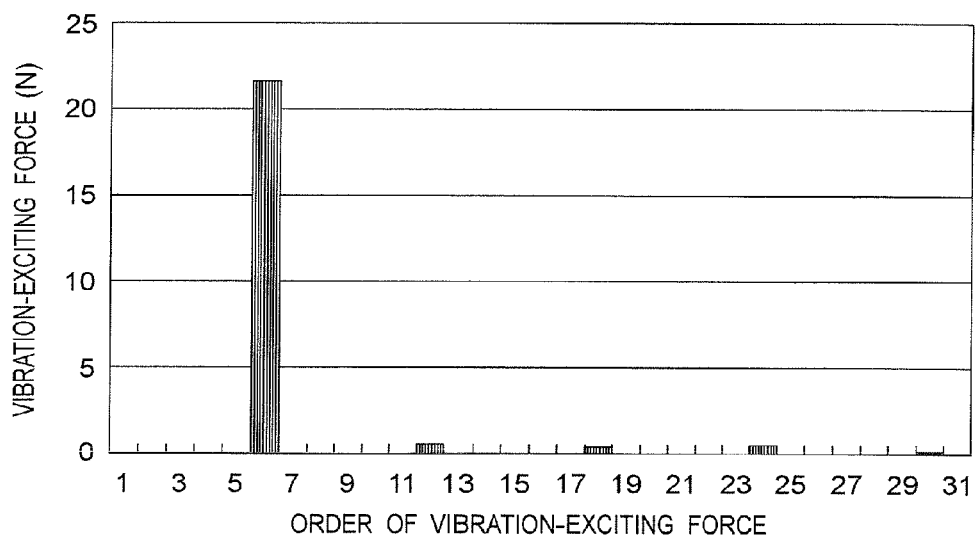
FIG. 16A is a graph showing vibration-exciting forces that act on individual tooth portions.

Vibration-exciting force that acts on the stator 40E of the above construction is explained. As shown in FIG. 16A, vibration-exciting force is generated at each tooth portion 46 with the order being 6N, 12N, 18N, 24N and 30N, where the vibration-exciting forces acting on the individual tooth portions 46 are balanced.

Figure 16B:
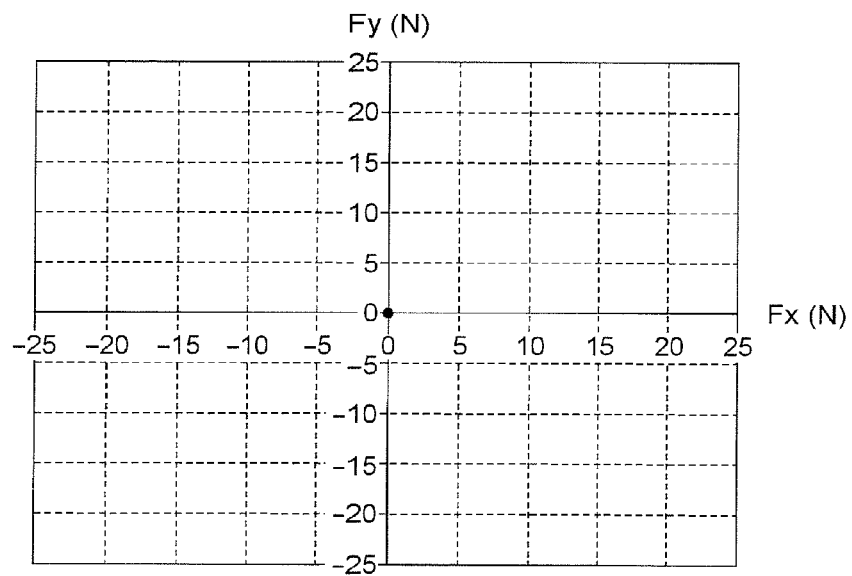
FIG. 16B is a graph showing vibration-exciting forces that act on the whole stator.

Then, as shown in FIG. 16B, the vibration-exciting force acting on the whole stator 40E results in 0, meaning that no force attributed to vibration-exciting forces acts on the stator 40E.

According to the stator constructed as described above, since it is satisfied that Q≦S and that Q=P×n/2 (where n is an integer of 1 or greater), an inter-magnetic pole balance can be achieved and imbalance of radial magnetic attractions can be prevented as with the functional effects of the fourth embodiment, so that noise and vibrations can be prevented.

The present invention is not limited to the above-mentioned embodiments. For example features of the first to sixth embodiments may be combined in various ways. Also, the compression mechanism section may be provided by not only a rotor type one but also a scroll type or reciprocating type one. Also, the number of slot portions, the number of tooth portions and the number of poles may be freely increased or decreased.

Further, the positions where the caulking portions are provided are not limited to portions radially outside the slot portions in the annular portion of the stator core. The caulking portions may also be provided in portions radially outside the tooth portions of the annular portion of the stator core or provided in the tooth portions.

Further, for all the caulking portions, it is necessary only that at least one center angle out of the center angles between neighboring caulking portions in all the caulking portions is different from the other center angles. It is also necessary only that with a number Q of caulking portions being an integer of 1 or greater, Q≦S and that Q=P×n/2 (where n is an integer of 1 or greater).

What is claimed is:
1. A stator comprising:
 a stator core including
  a plurality of stacked electromagnetic steel sheets,
  caulking portions configured to fix the plurality of electromagnetic steel sheets to each other, and
  a plurality of slot portions open toward an inner circumference side and arrayed along a circumferential direction, a number Q (an integer of 1 or greater) of the caulking portions, a number S of the slot portions and a number P of the poles satisfy Q≦S and Q=P×n/2 (where n is an integer of 1 or greater).

2. The stator as claimed in claim 1, wherein
Q<S and Q=P×n/2 (where n is an integer of 2 or greater),
a number of the caulking portions counting ½ of the number of the poles is a set, with neighboring caulking portions in each set of the caulking portions forming equal center angles therebetween, and
at least one center angle between neighboring caulking portions is different from the other center angles between other neighboring caulking portions.

3. The stator as claimed in claim 2, wherein
a difference between a largest center angle and a smallest center angle of the center angles formed between neighboring caulking portions is smaller than 240°/Q.

4. The stator as claimed in claim 2, wherein
a largest center angle of the center angles formed between neighboring caulking portions is smaller than two times a smallest center angle.

5. The stator as claimed in claim 1, wherein
Q is a divisor of S.

6. The stator as claimed in claim 1, further comprising:
a coil wound on the stator core, wherein
the stator core has an annular portion, and a plurality of tooth portions projecting radially inward from an inner circumferential surface of the annular portion and arrayed along the circumferential direction, and
the coil is wound on each tooth portion to form a concentrated winding.

7. A motor including the stator claimed in claim 1, further comprising:
a rotor, wherein
the stator is placed so as to surround an outer circumferential side of the rotor.

8. A compressor including the motor claimed in claim 7, further comprising:
a closed container; and
a compression mechanism section placed in the closed container, wherein
the motor is placed in the closed container to drive the compression mechanism section.

9. The compressor as claimed in claim 8, wherein
a refrigerant in the closed container is carbon dioxide.

* * * * *